Jan. 17, 1928.
F. H. OHLAND
1,656,495
APPARATUS FOR PREPARING WELLS
Filed Feb. 26, 1926    2 Sheets-Sheet 1
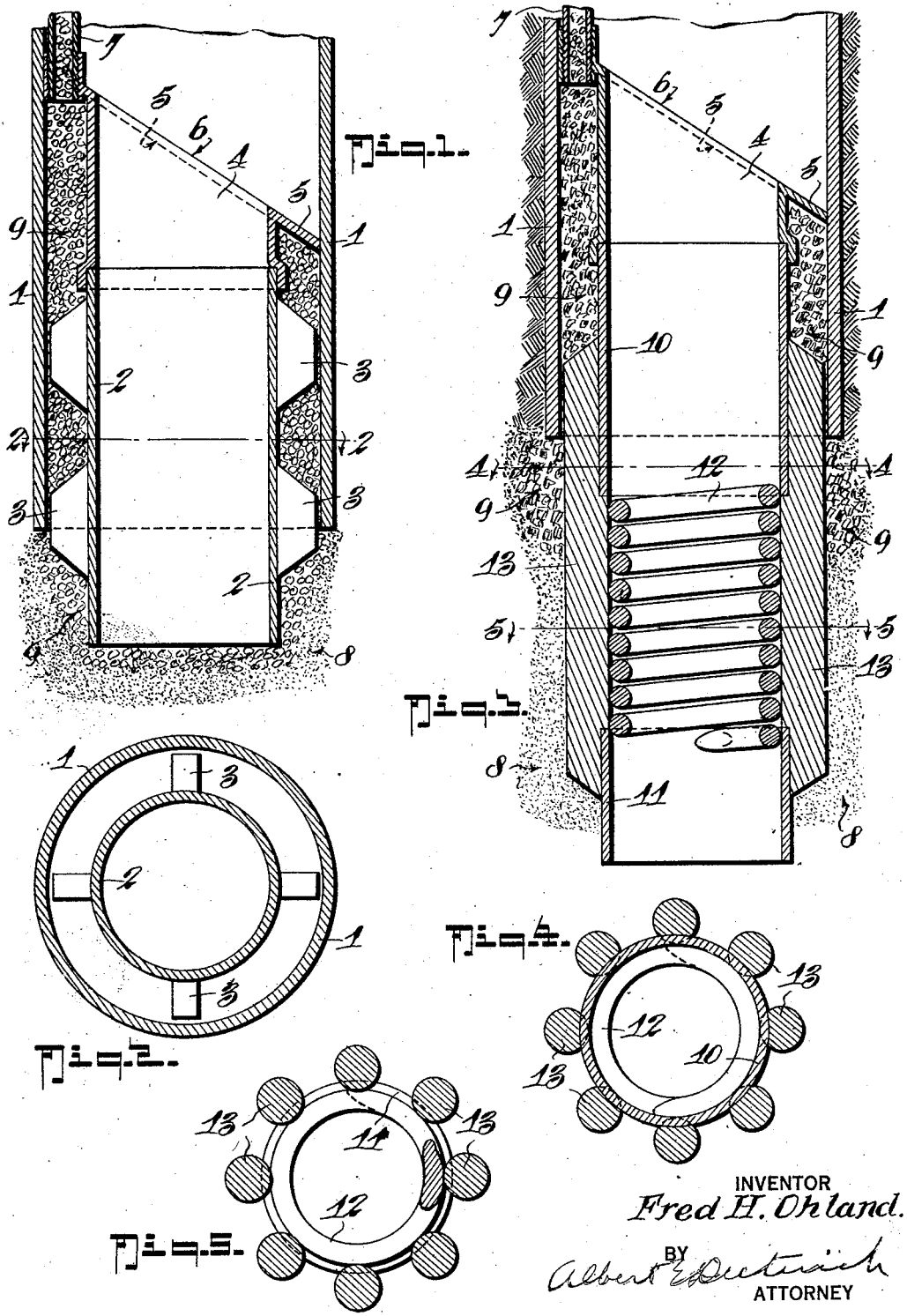
INVENTOR
*Fred H. Ohland.*
BY
ATTORNEY Jan. 17, 1928.
F. H. OHLAND
1,656,495
APPARATUS FOR PREPARING WELLS
Filed Feb. 26, 1926
2 Sheets-Sheet 2
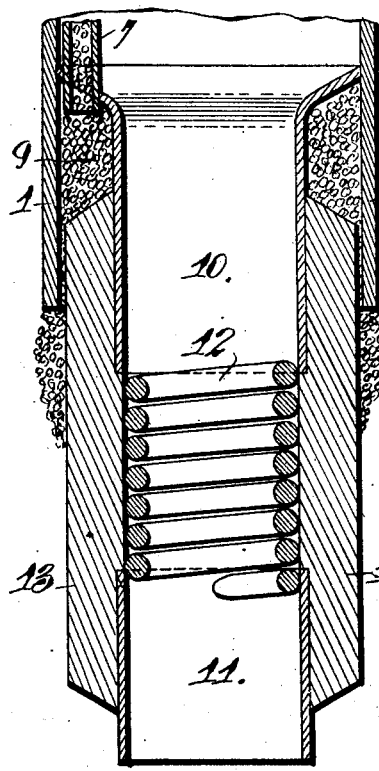
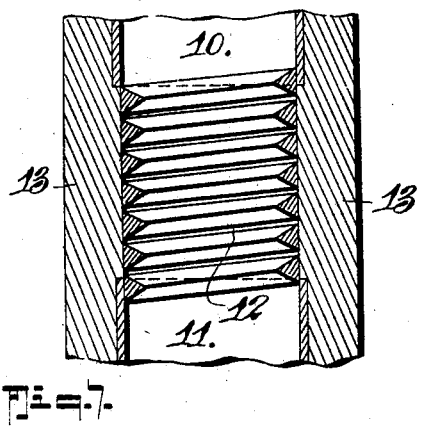
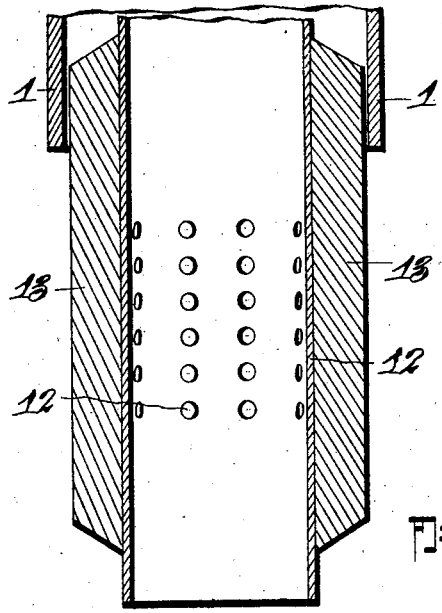
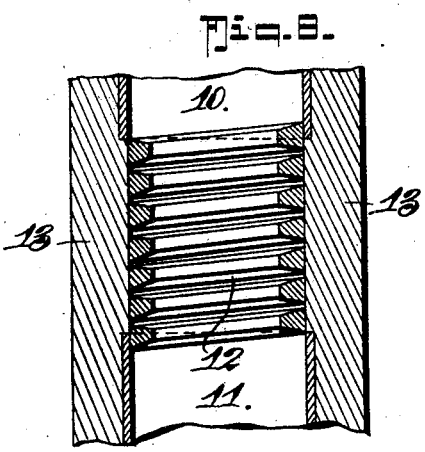
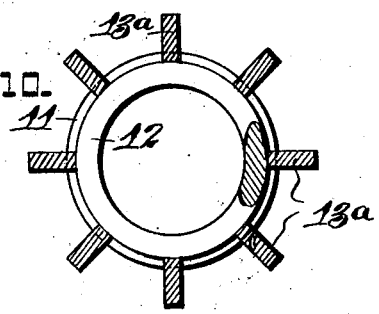
INVENTOR
*Fred H. Ohland.*
BY
ATTORNEY Patented Jan. 17, 1928.

1,656,495

UNITED STATES PATENT OFFICE.

FRED H. OHLAND, OF GIBBON, MINNESOTA.

APPARATUS FOR PREPARING WELLS.

Application filed February 26, 1926. Serial No. 90,823.

My invention has for its object to provide a simple effective way of preparing wells to facilitate the free flow of water and prevent clogging of the well; to this end the invention also includes a new construction of strainer unit and means cooperative therewith and with the well casing for displacing the sand surrounding the strainer with gravel after the strainer has been placed in the well and as the sand is being removed via the strainer and ascending column of water, or otherwise.

In general the invention provides for feeding gravel down into the well within the casing, withdrawing the sand through the strainer and at the same time replacing the sand with gravel of such coarseness that it will not pass through the strainer openings, thereby preparing the well by surrounding the strainer within the water bearing sand strata with a sheath.

In its more specific nature the invention provides a strainer of lesser diameter than that of the well casing and of such length that the perforated portion will lie in the sand strata beneath the casing while an imperforated section is projected into the well casing for a determined distance, means being provided to hold the strainer section spaced from the wall of the casing and thereby provide a gravel reservoir, into which gravel may be placed so that it may gravitate into the place once occupied by the sand as the sand is drawn through the strainer openings and removed from the well. Means are also provided for packing the well between casing and strainer sections to close the top of the gravel pocket against entry of sand that may be passing upwardly with the water stream through the interior of the strainer section and of the well casing.

In its still more specific nature the invention resides in those novel details of construction, combination and arrangement of parts, all of which will be first fully described, then be specifically pointed out in the appended claims, reference being had to the accompanying drawings, in which:—

Figure 1 is a vertical longitudinal section illustrating one embodiment of the invention.

Figure 2 is a cross section on the line 2—2 of Figure 1.

Figure 3 is a vertical longitudinal section of another embodiment of the invention.

Figure 4 is a cross section on the line 4—4 of Figure 3.

Figure 5 is a cross section on the line 5—5 of Figure 3.

Figure 6 is a vertical longitudinal section of another embodiment of the invention showing how the upper section of the strainer pipe may be flared to pack the well.

Figures 7 to 10 are detail views hereinafter referred to.

In the drawings in which like numerals of reference indicate like parts in all the figures, 1 represents the usual well casing which is sunk down to the water bearing sand strata 8 in the ordinary way. After the well casing is placed a tube 2 is lowered and worked with its lower end buried in the sand, leaving a portion of the tube projected within the casing 1 from which it is spaced by lugs or spacers 3.

The space between the casing 1 and the tube 2 constitutes a gravel reservoir and is filled with gravel 9 so that as the sand 8 beneath the casing and surrounding the pipe 2 passes under the bottom of the pipe 2 it is removed through the pipe, the gravel will work down from the gravel reservoir and replace the sand until the desired sheath of gravel is placed around and beneath the pipe 2.

The gravel is preferably placed in the pocket or reservoir by means of a duct 7 leading from the top of the well.

In carrying out my method of preparing wells according to its best practice, I prefer to use a packer 4 having a flange 5 to fit over the upper edge of the pipe 2 and close at the top the space between the casing 1 and the pipe 2 which constitutes the gravel reservoir. The packer 4 preferably has an inclined top 6 and the gravel duct discharges through the top 6 at its highest place as the gravel in feeding into the pocket beneath the packer top will gravitate around the pipe 2 in a similarly inclined manner.

I also prefer to use a strainer unit instead of the simple pipe 2. Such a strainer as I prefer to use constitutes a part of my present invention and comprises an upper pipe section 10 and a lower pipe section 11 between which is located the straining section 12, the latter preferably being constructed of coiled rod or wire of any suitable cross section as for instance round (see Figure 3), triangular (see Figure 7), or trapezoidal (see Figure 8) or any other desired shape, or it may be constructed of screening wire or perforated sheet metal section (see Figure 9). The preferred embodiment, however, is with the straining section 12 constructed of coiled rod.

When coiled rod or wire is used to make the straining part of the strainer unit it is preferable to coil the wire in such a way that the interior diameter of the coil is less than that of the adjacent pipe section 2 in order to facilitate cleaning or clearing out the spaces between the coils with a suitable rotatable cleaning tool (not shown) that can be let down into the well and strainer without making it necessary to remove the strainer for cleaning.

The strainer units also include a set of longitudinal rods 13 (Figure 5) or 13ª (Figure 10) of any suitable cross section, secured to the outside of the pipe sections 10 and 11 and strainer section 12 to hold the parts assembled and also to serve as spacers for spacing the strainer unit from the wall of the well casing into which the upper pipe section projects, thereby providing the gravel pocket or reservoir.

Instead of using a packer 4, the upper end of the pipe section 10 may be made of expansible metal such as lead, so that it may be expanded to make a tight joint between the strainer unit and well casing at the top of the gravel pocket.

As sand works into the strainer through the strainer section openings the gravel will work down around the strainer to take the place of the sand, the removal of sand and its replacement with gravel may be facilitated by surging the water back and forth with a suitable bailer.

By employing a strainer of the character herein shown and described the well and strainer interior will be left free of obstructions so that a strainer cleaning tool may be lowered into the well to remove any obstructions that may occur in the openings of the strainer, all without the necessity of taking the strainer out of the well.

When a strainer is used coarse sand, of a mesh that will not pass through the openings of the strainer, may be employed in lieu of gravel, it being, of course, understood that the size of the coarse sand particles or of the gravel will depend on the size of the openings in the strainer.

From the foregoing description, taken in connection with the accompanying drawings, it is thought that my invention will be clear to those skilled in the art.

What I claim is:

1. In combination with the well casing, a pipe section located within and spaced from the wall of said casing and projecting out of the lower end thereof, means maintaining said pipe section spaced from said casing to provide a gravel reservoir whereby as sand surrounding said pipe section beneath the casing is removed it will be replaced by the gravel from said reservoir and means for feeding gravel to said reservoir, said means comprising a packer between said pipe section and said casing, and a duct leading down to the packer and delivering into said reservoir, said packer comprising an extension pipe section fitted on top of the first mentioned pipe section and having an outer flange to fit the interior of the well casing and constituting a cutoff.

2. In combination with a well casing, a well screen comprising two pipe sections joined by a coil constituting a perforated area, a series of longitudinal bars secured to the outside of said pipe sections and coil and adapted to space the screen from the well casing thereby providing a gravel chamber between the screen and casing and means to close the upper end of the space between the screen pipe and the well casing, and means for delivering gravel into the space beneath the closure.

3. In combination with a well casing, a well screen comprising two pipe sections joined by a coil, the outer diameter of said coil being approximately equal to the inner diameter of said pipe sections, a series of longitudinal bars secured to the outside of said pipe sections and engaging said coil and adapted to space the screen from a well casing, thereby providing a gravel chamber between the screen and casing.

4. In combination with a well casing, a well screen comprising two pipe sections joined by a coil, the outer diameter of said coil being approximately equal to the inner diameter of said pipe sections, a series of longitudinal bars secured to the outside of said pipe sections and engaging said coil and adapted to space the screen from a well casing, thereby providing a gravel chamber between the screen and casing, an extension pipe section having a flanged end to fit over the upper end of the upper pipe section of the well screen, the upper end of said extension pipe section lying in an inclined plane and upwardly flanged to form a cutoff or closure for the space between the screen and well casing, and means for delivering gravel into the higher portion of that space for the purposes specified.

5. In combination with a well casing, a well screen comprising two pipe sections joined by a perforated area, a series of longitudinal bars secured to the outside of said pipe sections and perforated area and adapted to space the screen from a well casing, thereby providing a gravel chamber between the screen and casing, and means to close the upper end of the space between the screen pipe and the well casing, and means for delivering gravel into the space beneath the closure.

6. A strainer comprising two pipe sections arranged end to end and spaced apart, a coiled rod located between said ends and extending from one pipe section to the other, longitudinal bars secured wholly to the outside of said coiled rod and to the adjacent pipe sections, said longitudinal bars comprising radial projections extending a distance beyond the axis of the strainer greater than the external diameter of each of the pipe sections and the coiled rod and serving to unite the coiled rod and pipe sections into a rigid structure and also functioning as spacers to space the pipe sections and coiled rod from a well casing into which the strainer is put.

7. A strainer comprising two pipe sections arranged end to end and spaced apart, a coiled rod located between said ends and extending from one pipe section to the other, longitudinal bars secured to the outside of said coiled rod and to the adjacent pipe sections, the inner diameter of the pipe sections being greater than the inner diameter of the coiled rod for the purposes specified.

FRED H. OHLAND.